(12) United States Patent
Mueck et al.

(10) Patent No.: US 8,098,750 B2
(45) Date of Patent: Jan. 17, 2012

(54) METHOD AND DEVICE FOR TRANSMITTING A PLURALITY OF DATA SYMBOLS

(75) Inventors: Markus Dominik Mueck, Unterhaching (DE); Maik Bienas, Braunschweig (DE)

(73) Assignee: Infineon Technologies AG, Neubiberg (DE)

( * ) Notice: Subject to any disclaimer, the term of this patent is extended or adjusted under 35 U.S.C. 154(b) by 786 days.

(21) Appl. No.: 12/170,747

(22) Filed: Jul. 10, 2008

(65) Prior Publication Data

US 2010/0008447 A1    Jan. 14, 2010

(51) Int. Cl.
  H04K 1/10  (2006.01)
  H04L 27/28  (2006.01)
(52) U.S. Cl. ......... 375/260; 375/267; 375/295; 375/299
(58) Field of Classification Search .......... 375/259–260, 375/267, 295, 299
  See application file for complete search history.

(56) References Cited

U.S. PATENT DOCUMENTS

| | | | |
|---|---|---|---|
| 175,430 A | 3/1876 | Cook | |
| 601,178 A | 3/1898 | Strout | |
| 6,834,043 B1 | 12/2004 | Vook et al. | |
| 6,865,237 B1 | 3/2005 | Boariu et al. | |
| 7,885,176 B2 * | 2/2011 | Pi et al. ................... 370/204 | |
| 2003/0048857 A1 | 3/2003 | Onggosanusi et al. | |
| 2004/0184559 A1 | 9/2004 | Ballantyne | |
| 2005/0008065 A1 | 1/2005 | Schilling | |
| 2005/0068909 A1 | 3/2005 | Chae et al. | |
| 2005/0196684 A1 | 9/2005 | Nakamura et al. | |
| 2006/0008021 A1 | 1/2006 | Bonnet | |
| 2006/0034390 A1 | 2/2006 | Vummintala et al. | |
| 2006/0056538 A1 | 3/2006 | Nam et al. | |
| 2006/0084461 A1 | 4/2006 | Sekiya et al. | |
| 2006/0093060 A1 | 5/2006 | Jung et al. | |
| 2006/0146952 A1 | 7/2006 | Magee | |
| 2006/0210070 A1 | 9/2006 | Reznik et al. | |
| 2007/0058521 A1 | 3/2007 | Guo et al. | |
| 2007/0076805 A1 | 4/2007 | Kalluri et al. | |
| 2007/0116095 A1 | 5/2007 | Gerlach | |
| 2007/0202809 A1 | 8/2007 | Lastinger et al. | |
| 2007/0202818 A1 * | 8/2007 | Okamoto ................. 455/101 | |
| 2007/0230383 A1 | 10/2007 | Yune et al. | |
| 2007/0291638 A1 | 12/2007 | Chae et al. | |

(Continued)

FOREIGN PATENT DOCUMENTS

CN    1668035 A    9/2005

(Continued)

OTHER PUBLICATIONS

Alamouti, Siavash M.; "A Simple Transmit Diversity Technique for Wireless Communications"; IEEE Journal on Select Areas in Communications, vol. 16, No. 8, Oct. 1998, pp. 1451-1458.

(Continued)

*Primary Examiner* — Jean B Corrielus
(74) *Attorney, Agent, or Firm* — Dickstein Shapiro LLP (57) ABSTRACT

A method for transmitting a plurality of data symbols using a plurality of transmit antennas and a plurality of transmission resources is described, in which transmission symbols are generated and associated with the transmit antennas and transmission resources in such a way, such that if this association is represented in the form of a matrix, this matrix can be represented as the combination of two matrices comprising as components the data symbols multiplied with at least partially different weighting factors.

24 Claims, 3 Drawing Sheets

U.S. PATENT DOCUMENTS

| | | | |
|---|---|---|---|
| 2009/0041151 A1* | 2/2009 | Khan et al. .................... | 375/267 |
| 2010/0103901 A1* | 4/2010 | Miki et al. .................... | 370/330 |

FOREIGN PATENT DOCUMENTS

| | | | |
|---|---|---|---|
| CN | 1728592 | A | 2/2006 |
| CN | 101030672 | A | 9/2007 |
| FR | 2 545 065 | A1 | 11/1984 |
| JP | 2008-072403 | A | 3/2008 |
| KR | 10-0697537 | B1 | 3/2007 |
| SU | 1389943 | A1 | 4/1988 |
| WO | WO-2005/004351 | A1 | 1/2005 |
| WO | WO-2005/057838 | A1 | 6/2005 |
| WO | WO-2005/088882 | A1 | 9/2005 |
| WO | WO-2005/096519 | A1 | 10/2005 |
| WO | WO-2005/096531 | A1 | 10/2005 |
| WO | WO-2005/096535 | A1 | 10/2005 |
| WO | WO-2005/112329 | A1 | 11/2005 |
| WO | WO-2006/002550 | A1 | 1/2006 |
| WO | WO-2006/013699 | A1 | 2/2006 |
| WO | WO-2006/029362 | A1 | 3/2006 |
| WO | WO-2006/055241 | A2 | 5/2006 |
| WO | WO-2006/118496 | A1 | 11/2006 |
| WO | WO-2007/042717 | A1 | 4/2007 |
| WO | WO-2007/107507 | A1 | 9/2007 |

OTHER PUBLICATIONS

Tirkkonen, Olav et al.; "Minimal Non-Orthogonality Rate 1 Space-Time Block Code for 3+ Tx Antennas"; IEEE International Symposium on Spread Spectrum Techniques and Applications (ISSSTA), vol. 2, New Jersey, USA, Sep. 2000, pp. 429-432.

Jafarkhani, Hamid; "A Quasi-Orthogonal Space-Time Block Code"; IEEE Transactions on Communications, vol. 49, No. 1, Jan. 2001, pp. 1-4.

Papadias, Constantinos B. et al.; "Capacity-Approaching Space-Time Codes for Systems Employing Four Transmitter Antennas"; IEEE Transactions on Information Theory, vol. 49, No. 3, Mar. 2003, pp. 726-733. United States Patent 6,944,466, Mobile location estimation in a wireless communication system, Lucent Technologies Inc. Jun. 9, 2004.

Sibul, Leon H.; "Singular Value Decomposition in Adaptive Beamforming"; Proceedings of 25th Conference on Decision and Control, Athens, Greece, Dec. 1986, vol. 25, pp. 929-932.

Verdu, Sergio; "Multiuser Detection"; Cambridge University, ISBN 13 978-0521593731, 1998.

Sezginer, Serdar et al.; "Full-Rate Full-Diversity 2×2 Space-Time Codes of Reduced Decoder Complexity"; IEEE Communications Letters, vol. 11, No. 12, Dec. 2007.

\* cited by examiner

METHOD AND DEVICE FOR TRANSMITTING A PLURALITY OF DATA SYMBOLS

TECHNICAL FIELD

Embodiments of the invention relate generally to a method and a device for transmitting a plurality of data symbols.

BACKGROUND

Multi antenna transmission systems, such as Multiple-Input-Single-Output (MISO) and Multiple-Input-Multiple-Output (MIMO) systems offer the possibility to exploit diversity for a more efficient use of transmission resources. Schemes for associating data elements with transmit antennas to be used for their transmission that allow efficient use of the diversity offered by multi antenna systems are desirable.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

In cellular communication systems, a wireless link between a mobile terminal (also called User Equipment, UE) and a base station is used for exchanging information.

In order to better exploit the transmission resources (e.g. increase the spectral efficiency), schemes based on Multiple-Input-Single-Output (MISO), Multiple-Input-Multiple-Output (MIMO), etc. approaches, i.e. transmission methods using a plurality of transmit antennas and/or receiving antennas may be used. In such methods, a transmitter may exploit the additional diversity based on a suitable design of the signals to be fed to the various transmit antennas. In transmission, these signals undergo a channel convolution, for example, with impulse-response characteristics which are typically different for different pairs of a transmit antenna and a receive antenna.

In the recent years, a considerable amount of research has been done with the objective to find suitable MIMO-Codes—in other words, ways to suitably encode data to be transmitted on the transmitter side in order to enhance or optimize the system performance for a given number of antennas. There are two classes of approaches:

1) Open-Loop MIMO: In this case, multi antenna precoding is carried out without using CSI (Channel State Information), e.g. information about transmission characteristics between the transmitting antennas and the receiving antennas. For example, no information (e.g. fed back by the receiver) about the channel impulse responses between the transmitting antennas and receiving antennas is used in the transmission precoding. Examples for such transmission precoding are Space-Time-Block-Codes and Space-Frequency-Block-Codes, e.g. the Alamouti Code for a 2×1 (2 transmit antennas, 1 receiving antenna) antenna configuration. For higher dimensionality, there are full rate & full diversity schemes for binary modulations and, for example for ×1 antenna configurations, quasi-orthogonal codes such as the ABBA Code, the Extended Alamouti Code and the Papadias/Foschini Code.

2) Closed Loop MIMO: The efficiency of MIMO Codes may be further improved if CSI is available. In particular, Singular-Value-Decomposition (SVD) based beam-forming has been shown to be a very efficient approach.

Figure 1:
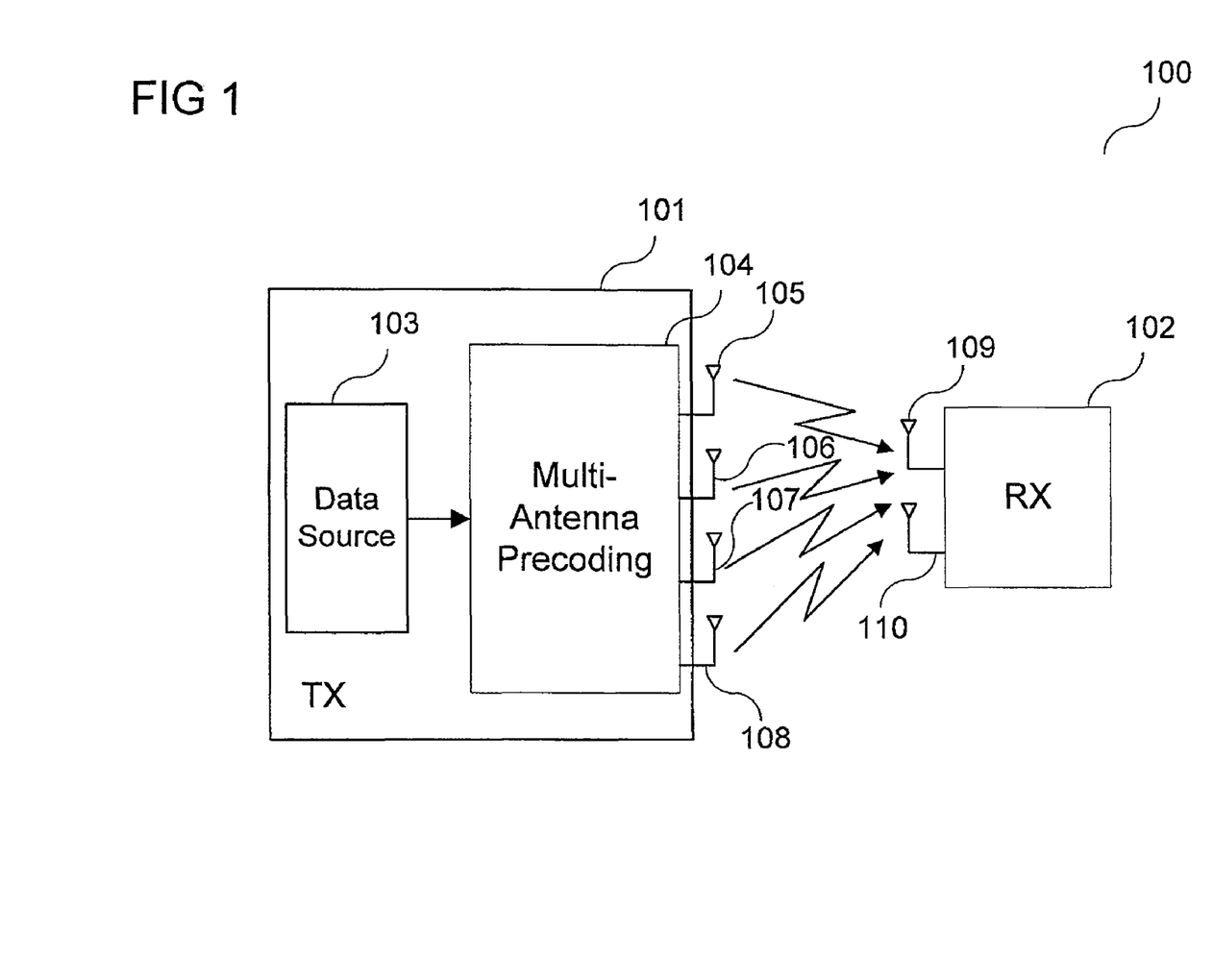
FIG. 1 shows a communication arrangement according to an embodiment.

FIG. 1 shows a communication arrangement 100 according to an embodiment.

The communication arrangement 100 includes a transmitter (TX) 101 and a receiver (RX) 102. The transmitter 101 includes a data source 103 which generates data to be transmitted in the form of data symbols (e.g. modulation symbols selected from a set of constellation symbols). The data symbols are supplied to a precoding circuit 104 which generates transmission symbols from the data symbols and associates each transmission symbol with one of a plurality of antennas 105, 106, 107, 108 and a transmission resource. Each transmission symbol is transmitted to the receiver 102, which may include a plurality of receiving antennas 109, 110 (for example two or more receiving antennas) using the antenna 105, 106, 107, 108 and the transmission resource associated with the transmission symbol. In this example, the transmitter includes four transmit antennas. In other embodiments, the transmitter may include less (e.g. three or four) or more (e.g. 8) antennas. For example, the transmitter includes a power of two antennas. The transmission resource is for example a time slot (e.g. a time transmission interval) or a (sub-)carrier signal. That means that a transmission symbol is for example associated with a time slot and is sent in this time slot or is associated with a carrier signal and is transmitted using this carrier signal (or both).

The association of transmission symbols to antennas and transmission resources can be represented as a matrix. For example, in the case of four antennas and four transmission resources (time slots or carrier signals), the association may be represented as the matrix $$\underline{S} = \begin{bmatrix} s_1 & s_2 & s_3 & s_4 \\ s_2^* & -s_1^* & s_4^* & -s_3^* \\ s_3 & s_4 & s_1 & s_2 \\ s_4^* & -s_3^* & s_2^* & -s_1^* \end{bmatrix}. \quad (1)$$

In this representation, the first column of the matrix S corresponds to the first antenna, the second column corresponds to the second antenna, the third column corresponds to the third antenna, and the fourth column corresponds to the fourth antenna. Analogously, the first row corresponds to the first transmission resource, the second row corresponds to the second transmission resource, the third row corresponds to the third transmission resource, and the fourth row corresponds to the fourth transmission resource. For example, if the transmission resources associated with the rows are time slots, this means that on the second antenna using the fourth time slot, the transmission symbol $-s_3^*$ is transmitted which is the negative complex conjugate of the data symbol $s_3$ that is provided by the data source 103 to be transmitted. The data symbols are for example QAM (Quadrature Amplitude Modulation) symbols or symbols according to PSK (Phase Shift Keying). It should be noted that the data symbols in the matrix representations of the generation of transmission symbols and their association with antennas and transmission resources may be permuted, i.e. the numbering of the data symbols is arbitrary.

Such a matrix which represents an association of transmission symbols to transmit antennas and transmission resources or, in other words, which represents a mapping of data symbols to transmit antennas and transmit resources and thus a multi-antenna preceding may be referred to as a multi-antenna precoding matrix.

It should be noted that if the transmission resources corresponding to the rows are time slots, an association of transmission symbols to transmission resources as represented by the matrix in (1) may be defined for each of a plurality of carrier signals used for transmission. Analogously, if the transmission resources corresponding to the rows are carrier signals, such an association may be defined for each of a plurality of time slots.

The transmitter 1001 is for example a base station (BS) of a communication system according to IEEE 802.16m (next generation WiMAX) and/or 3GPP LTE. The communication arrangement may also be configured according to other communication technology standards, such as UMTS (Universal Mobile Telecommunication System), GSM (Global System for Mobile Communication), FOMA (Freedom of Mobile Access) or CDMA2000 (CDMA: Code Division Multiple Access).

In one embodiment, the transmitter 101 uses four transmit antennas for transmission and the receiver 102, which is for example a mobile communication terminal, uses two receiving antennas for receiving the signals sent be the transmitter 101.

In one embodiment, a MIMO (Q)STBC/(Q)SFBC, i.e. (Quasi) Orthogonal Space Time Block Code/(Quasi) Orthogonal Space Frequency Block Code is used that allows open-loop communication and that exploits the additional diversity for $\geq 2$ receiving antennas compared to typical 4×1 Codes.

The 4×2 configuration is expected to play an important role in standards such as IEEE 802.16m (i.e. next generation WiMAX) and 3GPP LTE Advanced, since four antennas are expected to be standard in base stations while two antenna terminals are expected to be realistic candidates for a mass deployment.

For any antenna configuration such as the 4×2 antenna configuration, closed loop solutions may be used for performing beamforming. For this, knowledge on the CSI (channel state information) is required. For example, the channel impulse responses between all transmitter and receiver antennas may be required with a high accuracy. In practice, this may introduce a high signalling overhead between the receiver 102 and the transmitter 101. In one embodiment, a MIMO Coding scheme is used that does not require any CSI knowledge, i.e., in one embodiment, close loop solutions are not used.

For a 4×1 (TX/RX) antenna configuration, the following MIMO codes may be used:

a. ABBA Code, which may be represented as $$\underline{S}_{ABBA} = \begin{bmatrix} s_1 & s_2 & s_3 & s_4 \\ s_2^* & -s_1^* & s_4^* & -s_3^* \\ s_3 & s_4 & s_1 & s_2 \\ s_4^* & -s_3^* & s_2^* & -s_1^* \end{bmatrix} \quad (2)$$

b. Extended Alamouti Code which may be represented as $$\underline{S}_{EA} = \begin{bmatrix} s_1 & s_2 & s_3 & s_4 \\ s_2^* & -s_1^* & s_4^* & -s_3^* \\ s_3^* & s_4^* & -s_1^* & -s_2^* \\ s_4 & -s_3 & -s_2 & s_1 \end{bmatrix} \quad (3)$$

c. A code which has been defined by Papadias and Foschini which may be represented as $$\underline{S}_{PF} = \begin{bmatrix} s_1 & s_2 & s_3 & s_4 \\ s_2^* & -s_1^* & s_4^* & -s_3^* \\ s_3 & -s_4 & -s_1 & s_2 \\ s_4^* & s_3^* & -s_2^* & -s_1^* \end{bmatrix} \quad (4)$$

and which is in the following referred to as Papadias/Foschini Code.

The conversion of data symbols into transmission symbols (e.g. data symbol $s_1$ into transmission symbol $-s_1^*$) and the association of transmission symbols with transmit antennas and transmission resources is represented by these matrices as explained with reference to equation (1). The following matrix representations are to be understood in the same way.

All of the codes as represented by (2) to (4) are designed such that four distinct complex inputs (data symbols) $s_1$, $s_2$, $s_3$, $s_4$ are mapped onto the four transmission antennas, such that a single receiving antenna receives the signal $$\underline{y} = \underline{S} \cdot \underline{h} + \underline{n} \quad (5)$$

with $\underline{S} = \underline{S}_{ABBA}$, $\underline{S}_{EA}$ or $\underline{S}_{PF}$, $\underline{n}$ being a noise vector according to Gaussian additive noise, and the channel vector $\underline{h} = (h_1\ h_2\ h_3\ h_4)^T$ containing the (e.g. complex-valued) channel coefficients under the assumption of a single-tap multiplicative channel as it may be assumed for the carriers in an OFDM/OFDMA (Orthogonal Frequency Division Multiplexing/Orthogonal Frequency Division Multiple Access) system. Embodiments may also be used in the context of a communication channels with other properties, for example a communication channel which may be modelled using a multi-tap channel model or a model involving a convolution of a transmitted signal with a plurality of channel coefficients. Please note that each component of the receiving vector $\underline{y}$ corresponds to a received symbol received on or in the associated transmission resource, i.e. the first component of $\underline{y}$ is for example the received symbol received in the first time slot or on the first carrier signal.

The Codes as given in equations (2) to (4) may be seen as being adapted to the requirements of a system with a single receiving antenna. Multiple receiving antennas may be exploited by implementing a Maximum-Ratio-Combining receiver (maximizing the signal to noise ratio SNR), but the inherent diversity of a 4×2 TX/RX system (i.e. a system with four transmit antennas and two receiving antennas), for example, is still poorly exploited in this case. In one embodiment, a better exploitation of the inherent diversity for the specific application in the context of a 4×2 MIMO system is used.

For a 2×2 configuration, a 2×2 MIMO Code may be used which is based on an adaptation of the 2×1 MIMO Alamouti Scheme to a system of two receiving antennas (this code is still limited to 2 transmit antennas though). It may be represented by $$S_{2\times 2} = \begin{bmatrix} a \cdot s_1 + b \cdot s_3 & -c \cdot s_2^* - d \cdot s_4^* \\ a \cdot s_2 + b \cdot s_4 & c \cdot s_1^* + d \cdot s_3^* \end{bmatrix} \quad (6)$$

Similar as above, $s_1$, $s_2$, $s_3$, $s_4$ denote the complex-valued data symbols to be transmitted and a, b, c, d are complex-valued design parameters. This scheme is designed for a 2×2 MIMO configuration and it is not suitable for a 4×2 case.

Figure 2:
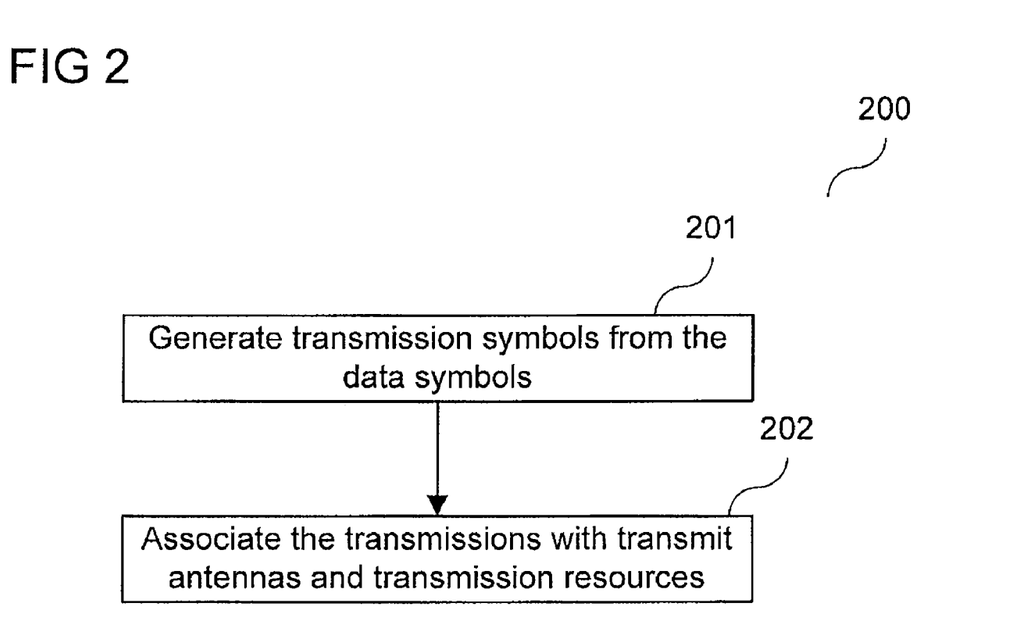
FIG. 2 shows a flow diagram according to an embodiment.

In one embodiment, a plurality of data symbols are transmitted using a plurality of transmit antennas and a plurality of transmission resources as it is illustrated in FIG. 2.

FIG. 2 shows a flow diagram 200 according to an embodiment.

In 201, a plurality of transmission symbols are generated from the plurality of data symbols, for example by multiplication with a (complex) weighting factor, forming the complex conjugate or the negative.

In 201, each transmission symbol is associated with one of the plurality of transmit antennas and one of the plurality of transmission resources.

The transmission symbols are generated and associated with the transmit antennas and transmission resources in such a way that if the transmission symbols are written in the form of a first matrix with a sub-vector in a first dimension (e.g. a row or a column) for each of the plurality of antennas and a sub-vector in a second dimension (different from the first dimension, for example orthogonal to the first dimension, such that the sub-vectors in the first dimension are for example columns and the sub-vectors in the second dimension are rows or vice versa, i.e. such that the first dimension corresponds to the columns and the second dimension to the rows or vice versa) for each of the plurality of the transmission resources, such that each component of the matrix holds the transmission symbol that is transmitted using the antenna corresponding to sub-vector in the first dimension in which the component is positioned and using the transmission resource corresponding to the sub-vector in the second dimension in which the component is positioned, the first matrix is representable as a combination of a second matrix and a third matrix (which are, for example both different from the zero matrix and/or from the identity matrix or do for example have only components that are not equal to zero or not equal to 1 or for example only have components that are dependent on the data symbols).

Thereby, for the second matrix and the third matrix it holds that each component of the matrix is equal to one of the data symbols or the complex conjugate of a data symbol to be transmitted multiplied by a weighting factor and the matrix may be divided into sub-matrices of dimension at least 2×2 (i.e. having at least two rows and at least two columns, e.g., in one embodiment of dimension $2^n \times 2^n$, where n is a positive integer) such that, for each two sub-matrices having only column sub-vectors of the same columns or row sub-vectors of the same rows, at least one component of one of the two sub-matrices differs from the corresponding component of the other of the two sub-matrices at least in the phase or the absolute value of the weighting factor.

The division of the matrix into sub-matrices is for example exhausting, i.e. every component of the matrix is part of one of the sub-matrices. For example, the division is such that each component is part of exactly one sub-matrix (such that no two sub-matrices have a component in common). The sub-matrices for example all have the same dimension, i.e. the same number of rows and columns. The sub-matrices having only column sub-vectors of the same columns or row sub-vectors of the same rows for example means that the sub-matrices are in the same group of columns or group of rows of the matrix (wherein the number of columns/rows in the group are equal to the number of columns/rows of one the sub-matrices) and/or that the sub-matrices are part of the same block-column (i.e. the column formed of sub-matrices according to the division of the matrix) or block-row (i.e. the row formed of sub-matrices according to the division of the matrix) and/or that the sub-matrices consist of sub-vectors of the same columns or rows of the matrix. This for example means that sub-matrices having only column sub-vectors of the same columns or row sub-vectors of the same rows comprise components of the same columns or the same rows of the matrix, respectively, i.e. it is not the case that one sub-matrix comprises a component of a column that the other does not comprise a component of or that one sub-matrix comprises a component of a row that the other does not comprise a component of, respectively.

In other words, in one embodiment, the multi antenna preceding matrix which defines the precoding scheme via the representation rules as explained with reference to equation (1) is determined as a combination (e.g. a sum, or a modulo sum) of two matrices (which for example have the same dimension as the multi antenna precoding matrix) having a certain structure, namely that they consist of sub-matrices of transmission symbols which are generated from the data symbols by weighting such that in sub-matrices which are in the same row of sub-matrices or the same column of sub-matrices include different weighting factors. Sub-matrices which are not in the same column or in the same row of sub-matrices may include the same weighting factors. For example, sub-matrices may have the same weighting factors when they are in the same diagonal or when they correspond to each other with respect to matrix transposition (i.e. when the sub-matrices switch position when the matrix is transposed).

The data symbols are for example complex valued. For example, the data symbols are constellation symbols such as according to 64QAM (Quadrature Amplitude Modulation) or PSK (Phase Shift Keying).

The weighting factors are for example complex valued. They may for example be complex numbers of absolute value 1, i.e. introduce a phase shift of the transmission symbol with respect to the corresponding data symbol by multiplication or may also have an absolute value different from 1 such that the transmission symbol has an absolute value different from the corresponding data symbol.

In one embodiment, four or more transmit antennas are used for transmission.

For example, two or more receiving antennas are used for transmission. I.e. the symbols which are transmitted are received using two or more receiving antennas. In one embodiment, four transmit antennas and two receiving antennas are used for transmission.

The first matrix is for example representable as the sum of the second matrix and the third matrix. In one embodiment, the first matrix is representable as a modulo sum of the second matrix and the third matrix. This means that if for example the second matrix and the third matrix are added and a modulo operation (which may also be referred to as modulo division) is carried out for each component of the sum of the two matrices (e.g. the same modulo division for every component, i.e. using the same divisor for each component), the resulting matrix is equal to the first matrix.

In one embodiment, the transmission symbols are received using a plurality of receiving antennas and the first matrix and the second matrix are based on multi-antenna precoding matrices for multi antenna systems having the same number of transmit antennas as in the plurality of transmit antennas and having less receiving antennas as in the plurality of receiving antennas. The second matrix and the third matrix are based on multi-antenna precoding matrices according to ABBA Code or Extended Alamouti Code or Papadias/Foschini Code. In one embodiment, at least one of the second matrix and the third matrix are based on the matrix or a transpose of the matrix $$S_{PF} = \begin{bmatrix} s_1 & s_2 & s_3 & s_4 \\ s_2^* & -s_1^* & s_4^* & -s_3^* \\ s_3 & -s_4 & -s_1 & s_2 \\ s_4^* & s_3^* & -s_2^* & -s_1^* \end{bmatrix},$$

where $s_1, s_2, s_3, s_4$ denote the data symbols or a permutation of the data symbols.

For example, the second matrix and the third matrix are each based on a multi-antennas precoding matrix for a system with less receiving antennas and differ from the respective multi-antennas preceding matrix for example by a weighting of the components.

In one embodiment the second matrix is equal to a multi-antenna precoding matrix for multi antenna systems having the same number of transmit antennas as in the plurality of transmit antennas and having half the number of receiving antennas as in the plurality of receiving antennas component-wisely mutliplied by complex constants. Analogously, the third matrix is for example equal to a multi-antenna precoding matrix for multi antenna systems having the same number of transmit antennas as in the plurality of transmit antennas and having half the number of receiving antennas as in the plurality of receiving antennas component-wisely mutliplied by complex constants.

In one embodiment, the method illustrated in FIG. 2 further includes grouping the plurality of data symbols to a plurality of blocks of data symbols, generating a block of transmission symbols for each block of data symbols and associating, for each block, each transmission symbol with an antenna and a transmission resource such that the association of the transmission symbols of the block of transmission blocks may be represented by the first matrix. For example, for a block of transmission symbols, every two transmission symbols are associated with at least a different antenna or a different transmission resource.

In one embodiment, the weighting factors of the data symbols according to the second matrix and the weighting factors of the data symbols according the third matrix are constant for different blocks of data symbols of the plurality of blocks of data symbols. In one embodiment, the type of combination of the second matrix and the third matrix is constant for different blocks of data symbols of the plurality of blocks of data symbols.

The transmission resources are for example carrier-signals or time slots.

The method illustrated in FIG. 2 is for example used in a radio communication system.

In one embodiment, for the second matrix and the third matrix it holds that each component of the matrix is equal to one of the data symbols or the complex conjugate of a data symbol to be transmitted multiplied by a weighting factor and the matrix may be divided into sub-matrices of dimension at least 2×2 such that, for each two sub-matrices not being in the same diagonal of sub-matrices of the sub-divided matrix, at least one component of one of the two sub-matrices differs from the corresponding component of the other of the two sub-matrices in the phase or the absolute value of the weighting factor.

In one embodiment, for the second matrix and the third matrix it holds that each component of the matrix is equal to one of the data symbols or the complex conjugate of a data symbol to be transmitted multiplied by a weighting factor and the matrix may be divided into sub-matrices of dimension at least 2×2 such that, for each two sub-matrices being in the same diagonal of sub-matrices of the sub-divided matrix, each component of one of the two sub-matrices includes the same weighting factor as the corresponding component of the other of the two sub-matrices except for multiplication with −1 and complex conjugation.

In one embodiment, it holds for the first matrix and the second matrix that if two components of the matrix are equal or the complex conjugate of a data symbol multiplied with a weighting factor and the data symbols are the same, the weighting factors are the same except for complex conjugation and sign.

Figure 3:
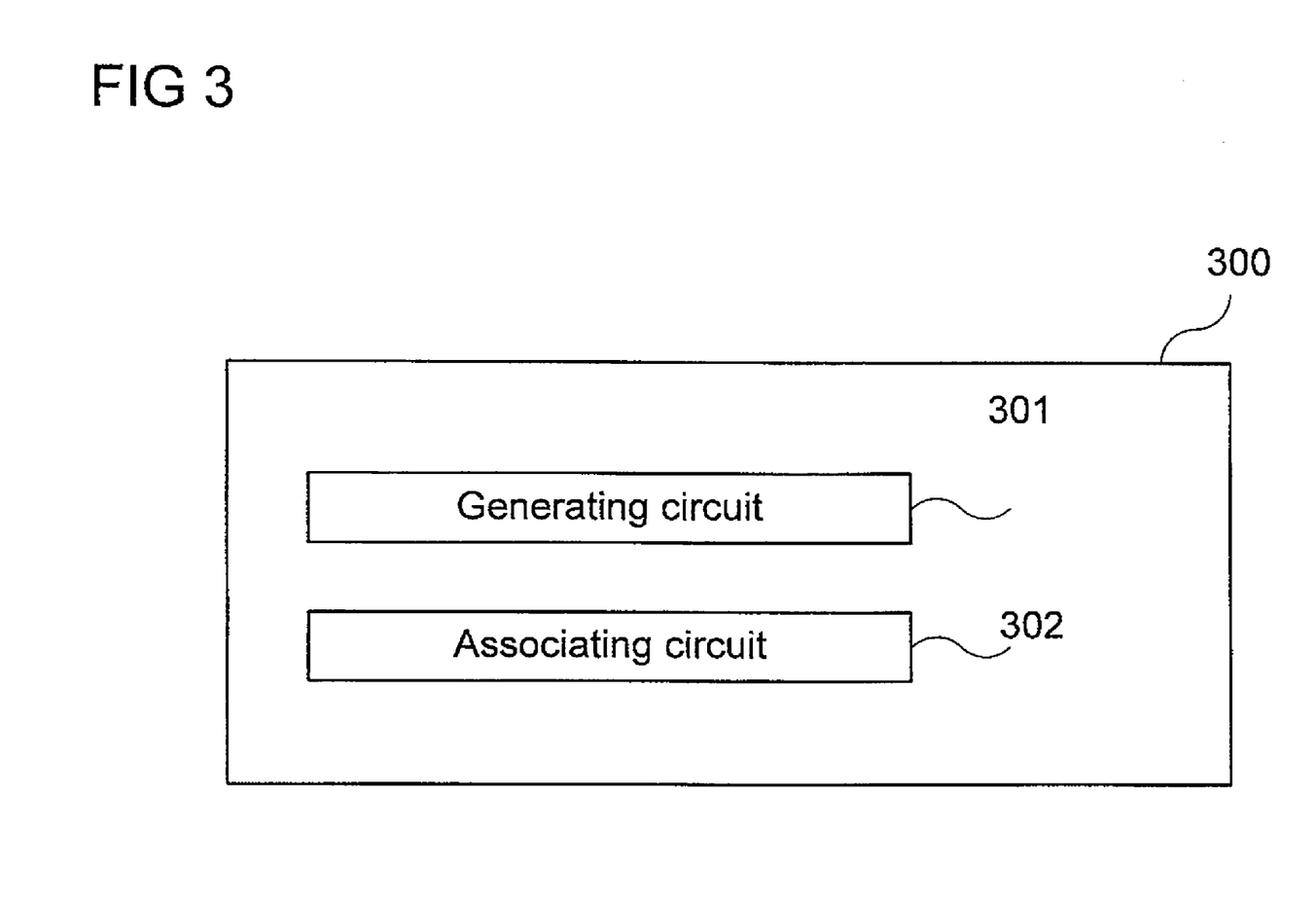
FIG. 3 shows a circuit according to an embodiment.

The method illustrated in FIG. 2 is for example carried out by a device as it is illustrated in FIG. 3, for example a MIMO preceding circuit in a transmitter.

FIG. 3 shows a circuit 300 according to an embodiment of the invention.

The circuit 300 is used for transmitting a plurality of data symbols using a plurality of transmit antennas and a plurality of transmission resources and includes a generating circuit 301 configured to generate a plurality of transmission symbols from the plurality of data symbols, and an association circuit 302 configured to associate each transmission symbol with one of the plurality of transmit antennas and one of the plurality of transmission resources.

The transmission symbols are generated and associated with the transmit antennas and transmission resources in such a way that if the transmission symbols are written in the form of a first matrix with a sub-vector in a first dimension for each of the plurality of antennas and a sub-vector in a second dimension for each of the plurality of the transmission resources, such that each component of the matrix holds the transmission symbol that is transmitted using the antenna corresponding to sub-vector in the first dimension in which the component is positioned and using the transmission resource corresponding to the sub-vector in the second dimension in which the component is positioned, the first matrix is representable as a combination of a second matrix and a third matrix; and wherein for the second matrix and the third matrix it holds that each component of the matrix is equal to one of the data symbols or the complex conjugate of a data symbol to be transmitted multiplied by a weighting factor and the matrix may be divided into sub-matrices of dimension at least 2×2 such that, for each two sub-matrices having only column sub-vectors of the same columns or row sub-vectors of the same rows, at least one component of one of the two sub-matrices differs from the corresponding component of the other of the two sub-matrices in the phase or the absolute value of the weighting factor.

In an embodiment, a "circuit" may be understood as any kind of a logic implementing entity, which may be hardware, software, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be software being implemented or executed by a processor, e.g. any kind of computer program, e.g. a computer program using a virtual machine code such as e.g. Java. Any other kind of implementation of the respective functions which will be described in more detail below may also be understood as a "circuit" in accordance with an alternative embodiment. The method according to FIG. 2 may for example be implemented using a circuit configured to carry out this method.

In the following, an embodiment in the (Q)STBC/(Q)SFBC for a 4×2 MIMO context (i.e., for 4 TX antennas and a suitable number of at least 2 RX antennas) is described which may be seen as being based on an extension and combination of the 4×1 Codes as given in equations (2), (3) and (4).

In one embodiment, two code combination types may be used (e.g. by the transmitter 101 that is for example a base station) that are described in the following.

According to Code Combination Type-I, complex-valued design parameters $a_1$, $b_1$, $c_1$, $d_1$ and $a_2$, $b_2$, $c_2$, $d_2$ are introduced and eight data symbols (e.g. QAM symbols or PSK symbols) $s_1$, $s_2$, $s_3$, $s_4$, $s_5$, $s_6$, $s_7$, $s_8$ are used as input for an association step (i.e. data symbols are processed in blocks of eight data symbols). For the generation of transmission symbols from the data symbols and the association of the data symbols with transmit antennas and transmit resources the following matrices are defined:

$$\underline{S}_{ABBA}^{(1)} = \begin{bmatrix} a_1 \cdot s_1 & b_1 \cdot s_2 & c_1 \cdot s_3 & d_1 \cdot s_4 \\ a_1 \cdot s_2^* & -b_1 \cdot s_1^* & c_1 \cdot s_4^* & -d_1 \cdot s_3^* \\ c_1 \cdot s_3 & d_1 \cdot s_4 & a_1 \cdot s_1 & b_1 \cdot s_2 \\ c_1 \cdot s_4^* & -d_1 \cdot s_3^* & a_1 \cdot s_2^* & -b_1 \cdot s_1^* \end{bmatrix} \quad (7)$$

$$\underline{S}_{ABBA}^{(2)} = \begin{bmatrix} a_2 \cdot s_5 & b_2 \cdot s_6 & c_2 \cdot s_7 & d_2 \cdot s_8 \\ a_2 \cdot s_6^* & -b_2 \cdot s_5^* & c_2 \cdot s_8^* & -d_2 \cdot s_7^* \\ c_2 \cdot s_7 & d_2 \cdot s_8 & a_2 \cdot s_5 & b_2 \cdot s_6 \\ c_2 \cdot s_8^* & -d_2 \cdot s_7^* & a_2 \cdot s_6^* & -b_2 \cdot s_5^* \end{bmatrix} \quad (8)$$

$$\underline{S}_{EA}^{(1)} = \begin{bmatrix} a_1 \cdot s_1 & b_1 \cdot s_2 & c_1 \cdot s_3 & d_1 \cdot s_4 \\ a_1 \cdot s_2^* & -b_1 \cdot s_1^* & c_1 \cdot s_4^* & -d_1 \cdot s_3^* \\ c_1^* \cdot s_3^* & d_1^* \cdot s_4^* & -a_1^* \cdot s_1^* & -b_1^* \cdot s_2^* \\ c_1^* \cdot s_4 & -d_1^* \cdot s_3 & -a_1^* \cdot s_2 & b_1^* \cdot s_1 \end{bmatrix} \quad (9)$$

$$\underline{S}_{EA}^{(2)} = \begin{bmatrix} a_2 \cdot s_5 & b_2 \cdot s_6 & c_2 \cdot s_7 & d_2 \cdot s_8 \\ a_2 \cdot s_6^* & -b_2 \cdot s_5^* & c_2 \cdot s_8^* & -d_2 \cdot s_7^* \\ c_2^* \cdot s_7^* & d_2^* \cdot s_8^* & -a_2^* \cdot s_5^* & -b_2^* \cdot s_6^* \\ c_2^* \cdot s_8 & -d_2^* \cdot s_7 & -a_2^* \cdot s_6 & b_2^* \cdot s_5 \end{bmatrix} \quad (10)$$

$$\underline{S}_{PF}^{(1)} = \begin{bmatrix} a_1 \cdot s_1 & b_1 \cdot s_2 & c_1 \cdot s_3 & d_1 \cdot s_4 \\ a_1 \cdot s_2^* & -b_1 \cdot s_1^* & c_1 \cdot s_4^* & -d_1 \cdot s_3^* \\ c_1 \cdot s_3 & -d_1 \cdot s_4 & -a_1 \cdot s_1 & b_1 \cdot s_2 \\ c_1 \cdot s_4^* & d_1 \cdot s_3^* & -a_1 \cdot s_2^* & -b_1 \cdot s_1^* \end{bmatrix} \quad (11)$$

$$\underline{S}_{PF}^{(2)} = \begin{bmatrix} a_2 \cdot s_5 & b_2 \cdot s_6 & c_2 \cdot s_7 & d_2 \cdot s_8 \\ a_2 \cdot s_6^* & -b_2 \cdot s_5^* & c_2 \cdot s_8^* & -d_2 \cdot s_7^* \\ c_2 \cdot s_7 & -d_2 \cdot s_8 & -a_2 \cdot s_5 & b_2 \cdot s_6 \\ c_2 \cdot s_8^* & d_2 \cdot s_7^* & -a_2 \cdot s_6^* & -b_2 \cdot s_5^* \end{bmatrix} \quad (12)$$

In one embodiment, the transmission symbols are generated and associated with the transmit antennas and the transmission resources according to a linear combination of a matrix with superfix 1 in (7) to (12) and a matrix with superfix 2 in (7) to (12) (assuming that the generation of transmission symbols and the association to transmit antennas/transmission resources is represented as a matrix as described above with reference to equation (1)). Examples for such a combination are $$g_1 \cdot \underline{S}_{ABBA}^{(1)} + g_2 \cdot \underline{S}_{ABBA}^{(2)} \quad (13)$$

$$g_1 \cdot \underline{S}_{ABBA}^{(1)} + g_2 \cdot \underline{S}_{EA}^{(2)} \quad (14)$$

$$g_1 \cdot \underline{S}_{ABBA}^{(1)} + g_2 \cdot \underline{S}_{PF}^{(2)} \quad (15)$$

$$g_1 \cdot \underline{S}_{EA}^{(1)} + g_2 \cdot \underline{S}_{ABBA}^{(2)} \quad (16)$$

$$g_1 \cdot \underline{S}_{EA}^{(1)} + g_2 \cdot \underline{S}_{EA}^{(2)} \quad (17)$$

$$g_1 \cdot \underline{S}_{EA}^{(1)} + g_2 \cdot \underline{S}_{PF}^{(2)} \quad (18)$$

$$g_1 \cdot \underline{S}_{EA}^{(1)} + g_2 \cdot \underline{S}_{ABBA}^{(2)} \quad (19)$$

$$g_1 \cdot \underline{S}_{PF}^{(1)} + g_2 \cdot \underline{S}_{EA}^{(2)} \quad (20)$$

$$g_1 \cdot \underline{S}_{PF}^{(1)} + g_2 \cdot \underline{S}_{PF}^{(2)} \quad (21)$$

wherein $g_1$, $g_2$ are complex numbers (in one embodiment real positive scalars) representing gain factors. It should be noted that the $g_1$, $g_2$ used for the various combinations according to (13) to (21) may be different for different combinations.

This approach may be generalized to any 4×K configuration with K=2, 3, 4, . . . . For example, with K=3, further matrices $S_{ABBA}^{(3)}$, $S_{EA}^{(3)}$, $S_{PF}^{(3)}$ are introduced with a corresponding update of the design parameters (from $S_x^{(2)} \rightarrow S_x^{(3)}$: $a_2 \rightarrow a_3$, $b_2 \rightarrow b_3$, . . . ), i.e. instead of $a_2$ in $S_x^{(2)}$ a newly introduced $a_3$ is used in $S_x^{(3)}$ etc. and of the symbols to be transmitted (from $S_x^{(2)} \rightarrow \overline{S}_x^{(3)}$: $s_5 \rightarrow s_9$, $s_6 \rightarrow s_{10}$, . . . ). Here, x is a placeholder for $\overline{ABBA}$, PF or EA.

The design parameters ($a_i$ and $b_i$ for i=1, 2, . . . ) are for example chosen based on the following rank criterion and/or the following determinant criterion.

1) Rank Criterion:
The diversity gain $$d(X) = \min_{\substack{X, \hat{X} \in X \\ X \neq \hat{X}}} \text{rank}\left[(\underline{X} - \underline{\hat{X}})(\underline{X} - \underline{\hat{X}})^H\right]$$

should be maximised (where $(\cdot)^H = ((\cdot)^T)^*$ is the Hermitian transpose, i.e. the complex conjugate of the transposed matrix). Thereby by, X and $\hat{X}$ are matrices according to the matrix representation each according to one set of data symbols. For example, X is the matrix representing the code where are a first set of possible data symbols has been inserted for $s_1, \ldots, s_8$ and $\hat{X}$ is the matrix representing the code where are a second set of possible data symbols different from the first set has been inserted for $s_1, \ldots, s_8$. This means that the minimum is taken over all possible pairs of transmission symbol matrices for this code. Thus, X is the set of possible matrices of transmission symbols of this code.

2) Determinant Criterion:
The coding gain $$\delta = \min_{\substack{X, \hat{X} \in X \\ X \neq \hat{X}}} \det\left[(\underline{X} - \underline{\hat{X}})(\underline{X} - \underline{\hat{X}})^H\right]$$

should be maximized for a given average transmit power (where det(.) means the determinant). As in the case of the rank criterion, X is the set of possible matrices of transmission symbols of this code.

According to Code Combination Type-II, instead of introducing the design parameters $a_1$, $b_1$, $c_1$, $d_1$ and $a_2$, $b_2$, $c_2$, $d_2$ as multiplicative factors within the matrices as given by expressions (7) to (12), a matrix pre-multiplication approach is used. For that purpose, the following matrices are introduced with suitable phases $\phi_1$ and $\phi_2$:

$$\underline{S}_{ABBA}^{(II)} = \begin{bmatrix} e^{j\varphi_1} \cdot s_5 & e^{j\varphi_1} \cdot s_6 & e^{j\varphi_2} \cdot s_7 & e^{j\varphi_2} \cdot s_8 \\ e^{-j\varphi_1} \cdot s_6^* & -e^{-j\varphi_1} \cdot s_5^* & e^{-j\varphi_2} \cdot s_8^* & -e^{-j\varphi_2} \cdot s_7^* \\ e^{j\varphi_2} \cdot s_7 & e^{j\varphi_2} \cdot s_8 & e^{j\varphi_1} \cdot s_5 & e^{j\varphi_1} \cdot s_6 \\ e^{-j\varphi_2} \cdot s_8^* & -e^{j\varphi_1} \cdot s_7^* & e^{-j\varphi_1} \cdot s_6^* & -e^{-j\varphi_1} \cdot s_5^* \end{bmatrix} \quad (22)$$

$$\underline{S}_{EA}^{(II)} = \begin{bmatrix} e^{j\varphi_1} \cdot s_5 & e^{j\varphi_1} \cdot s_6 & e^{j\varphi_2} \cdot s_7 & e^{j\varphi_2} \cdot s_8 \\ e^{-j\varphi_1} \cdot s_6^* & -e^{-j\varphi_1} \cdot s_5^* & e^{-j\varphi_2} \cdot s_8^* & -e^{-j\varphi_2} \cdot s_7^* \\ e^{-j\varphi_2} \cdot s_7^* & e^{-j\varphi_2} \cdot s_8^* & -e^{-j\varphi_1} \cdot s_5^* & -e^{-j\varphi_1} \cdot s_6^* \\ e^{j\varphi_2} \cdot s_8 & -e^{j\varphi_2} \cdot s_7 & -e^{j\varphi_1} \cdot s_6 & e^{j\varphi_1} \cdot s_5 \end{bmatrix} \quad (23)$$

$$\underline{S}_{PF}^{(II)} = \begin{bmatrix} e^{j\varphi_1} \cdot s_5 & e^{j\varphi_1} \cdot s_6 & e^{j\varphi_2} \cdot s_7 & e^{j\varphi_2} \cdot s_8 \\ e^{-j\varphi_1} \cdot s_6^* & -e^{-j\varphi_1} \cdot s_5^* & e^{-j\varphi_2} \cdot s_8^* & -e^{-j\varphi_2} \cdot s_7^* \\ e^{j\varphi_2} \cdot s_7 & -e^{j\varphi_2} \cdot s_8 & -e^{j\varphi_1} \cdot s_5 & e^{j\varphi_1} \cdot s_6 \\ e^{-j\varphi_2} \cdot s_8^* & e^{-j\varphi_2} \cdot s_7^* & -e^{-j\varphi_1} \cdot s_6^* & -e^{-j\varphi_1} \cdot s_5^* \end{bmatrix} \quad (24)$$

By introducing a unitary matrix $\underline{M}$ such that $\underline{M} \cdot \underline{M}^H = \underline{I}$ (with $(\cdot)^H = ((\cdot)^T)^*$ being the hermitian transpose and $\underline{I}$ being the identity matrix), the generation of transmission symbols and association of the transmission symbols with transmit antennas and transmission resources as used in this embodiment can be written as $$g_1 \cdot \underline{S}_{ABBA} + g_2 \cdot \underline{M} \cdot \underline{S}_{ABBA}^{(II)} \quad (25)$$

$$g_1 \cdot \underline{S}_{ABBA} + g_2 \cdot \underline{M} \cdot \underline{S}_{EA}^{(II)} \quad (26)$$

$$g_1 \cdot \underline{S}_{ABBA} + g_2 \cdot \underline{M} \cdot \underline{S}_{PF}^{(II)} \quad (27)$$

$$g_1 \cdot \underline{S}_{EA} + g_2 \cdot \underline{M} \cdot \underline{S}_{ABBA}^{(II)} \quad (28)$$

$$g_1 \cdot \underline{S}_{EA} + g_2 \cdot \underline{M} \cdot \underline{S}_{EA}^{(II)} \quad (29)$$

$$g_1 \cdot \underline{S}_{EA} + g_2 \cdot \underline{M} \cdot \underline{S}_{PF}^{(II)} \quad (30)$$

$$g_1 \cdot \underline{S}_{PF} + g_2 \cdot \underline{M} \cdot \underline{S}_{ABBA}^{(II)} \quad (31)$$

$$g_1 \cdot \underline{S}_{PF} + g_2 \cdot \underline{M} \cdot \underline{S}_{EA}^{(II)} \quad (32)$$

$$g_1 \cdot \underline{S}_{PF} + g_2 \cdot \underline{M} \cdot \underline{S}_{PF}^{(II)} \quad (33)$$

As can be seen, these matrix expressions are combinations of the matrices (2), (3), (4) and (11), (12), (13) with $g_1$, $g_2$ being complex numbers (in one embodiment real positive scalars) representing gain factors that may be different for different combinations according to (25) to (33).

The angles $\phi_1$ and $\phi_2$ and the matrix $\underline{M}$ are preferably designed based on the rank criterion and the determinant criterion as described above.

It should be noted that the matrices according to (7) to (12) and (22) to (24) may be each divided into four 2 times 2 (2×2) sub-matrices according to the division of the second matrix and the third matrix as it is described with reference to FIG. 2. A matrix according to any one of the combinations (13) to (21) and (25) to (33) may therefore be seen as an example of the first matrix in the description of FIG. 2.

For example, in one embodiment, the transmitter 101 uses the code according to the matrix $\underline{S} = g_1 \cdot \underline{S}_{ABBA} + g_2 \cdot \underline{M} \cdot \underline{S}_{ABBA}^{(II)}$ and the design parameters and gain factors are suitably chosen. The transmission symbols as specified in the matrix are mapped to the transmit antennas 105, 106, 107, 108. The first receiving antenna 109 receives the signal vector $\underline{y}_1$ and the second receiving antenna receives the signal $\underline{y}_2$ given as $$\underline{y}_1 = \underline{S} \cdot \underline{h}_1 + \underline{n}_1 \quad (34)$$

$$\underline{y}_2 = \underline{S} \cdot \underline{h}_2 + \underline{n}_2 \quad (35)$$

with $\underline{n}_1$, $\underline{n}_2$ being noise vectors according to Gaussian additive noise, the channel vector $\underline{h}_1 = (h_{11}\ h_{12}\ h_{13}\ h_{14})^T$ containing the channel coefficients between all four transmit antennas and the first RX antenna, the channel vector $\underline{h}_2 = (h_{21}\ h_{22}\ h_{23}\ h_{24})^T$ containing the (e.g. complex-valued) channel coefficients between all four transmit antennas and the second receiving antenna and wherein a single-tap multiplicative channel (such it may be assumed for each carrier in an OFDM/OFDMA system) is assumed.

Based on the received signal vectors $\underline{y}_1$ and $\underline{y}_2$, the data symbols are extracted by a suitable decoder. For example, a near maximum likelihood receiver is used based on a sphere decoding algorithm.

The embodiment with four transmit antennas and two receiving antennas, as it is illustrated in FIG. 3 is for example intended to be used in future communications systems. Four antennas in the base station are typically technically feasible without any problem and two receiving antennas are typically also technically feasible even on a small-scale handset-device. For example the embodiments described above for 4×2 antenna configurations may be used for next generation WiMAX, LTE Advanced and similar communication systems.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for transmitting a plurality of data symbols using a plurality of transmit antennas and a plurality of transmission resources comprising:
   generating a plurality of transmission symbols from the plurality of data symbols; and
   associating each transmission symbol with one of the plurality of transmit antennas and one of the plurality of transmission resources;
   wherein the transmission symbols are generated and associated with the transmit antennas and transmission resources such that the transmission symbols are written in the form of a first matrix with a sub-vector in a first dimension for each of the plurality of antennas and a sub-vector in a second dimension for each of the plurality of the transmission resources, such that each component of the matrix holds the transmission symbol that is transmitted using the antenna corresponding to sub-vector in the first dimension in which the component is positioned and using the transmission resource corresponding to the sub-vector in the second dimension in which the component is positioned, and the first matrix is represented as a combination of a second matrix and a third matrix, and
   wherein for each of the second matrix and the third matrix, each component of the matrix is equal to one of the data symbols or the complex conjugate of a data symbol to be transmitted multiplied by a weighting factor and the matrix is divisible into sub-matrices of dimension at least 2×2 such that, for each two sub-matrices having only column sub-vectors of the same columns or row sub-vectors of the same rows, at least one component of one of the two sub-matrices differs from the corresponding component of the other of the two sub-matrices at least in the phase or the absolute value of the weighting factor.

2. The method according to claim 1, wherein the data symbols are complex valued.

3. The method according to claim 1, wherein the weighting factors are complex valued.

4. The method according to claim 1, wherein four or more transmit antennas are used for transmission.

5. The method according to claim 1, wherein two or more receiving antennas are used for transmission.

6. The method according to claim 1, wherein four transmit antennas and two receiving antennas are used for transmission.

7. The method according to claim 1, wherein the first matrix is represented as the sum of the second matrix and the third matrix.

8. The method according to claim 1, wherein the first matrix is represented as a modulo sum of the second matrix and the third matrix.

9. The method according to claim 1, wherein the transmission symbols are received using a plurality of receiving antennas and wherein the first matrix and the second matrix are based on multi-antenna precoding matrices for multi antenna systems having the same number of transmit antennas as in the plurality of transmit antennas and having less receiving antennas as in the plurality of receiving antennas.

10. The method according to claim 9, wherein the second matrix and the third matrix are based on multi-antenna precoding matrices according to ABBA Code, Extended Alamouti Code.

11. The method according to claim 9, wherein at least one of the second matrix and the third matrix are based on the matrix or a transpose of the matrix $$S_{PF} = \begin{bmatrix} s_1 & s_2 & s_3 & s_4 \\ s_2^* & -s_1^* & s_4^* & -s_3^* \\ s_3 & -s_4 & -s_1 & s_2 \\ s_4^* & s_3^* & -s_2^* & -s_1^* \end{bmatrix},$$

where $s_1, s_2, s_3, s_4$ denote the data symbols or a permutation of the data symbols.

12. The method according to claim 9, wherein the second matrix is equal to a multi-antenna precoding matrix for multi antenna systems having the same number of transmit antennas as in the plurality of transmit antennas and having half the number of receiving antennas as in the plurality of receiving antennas multiplied by complex constants component by component.

13. The method according to claim 9, wherein the third matrix is equal to a multi-antenna precoding matrix for multi antenna systems having the same number of transmit antennas as in the plurality of transmit antennas and having half the number of receiving antennas as in the plurality of receiving antennas multiplied by complex constants component by component.

14. The method according to claim 1, further comprising grouping the plurality of data symbols to a plurality of blocks of data symbols, generating a block of transmission symbols for each block of data symbols and associating, for each block, each transmission symbol with an antenna and a transmission resource such that the association of the transmission symbols of the block of transmission blocks is represented by the first matrix.

15. The method according to claim 14, wherein for a block of transmission symbols, every two transmission symbols are associated with at least a different antenna or a different transmission resource.

16. The method according to claim 14, wherein the weighting factors of the data symbols according to the second matrix and the weighting factors of the data symbols according the third matrix are constant for different blocks of data symbols of the plurality of blocks of data symbols.

17. The method according to claim 14, wherein the code combination type of combination of the second matrix and the third matrix is constant for different blocks of data symbols of the plurality of blocks of data symbols.

18. The method according to claim 1, wherein the transmission resources are carrier-signals or time slots.

19. The method according to claim 1, being used in a radio communication system.

20. The method according to claim 1, wherein for each of the second matrix and the third matrix,
each component of the matrix is equal to one of the data symbols or the complex conjugate of a data symbol to be transmitted multiplied by a weighting factor, and
the matrix is divisible into sub-matrices of dimension at least 2×2 such that, for each two sub-matrices not being in the same diagonal of sub-matrices of the sub-divided matrix, at least one component of one of the two sub-matrices differs from the corresponding component of the other of the two sub-matrices in the phase or the absolute value of the weighting factor.

21. The method according to claim 1, wherein for each of the second matrix and the third matrix,
each component of the matrix is equal to one of the data symbols or the complex conjugate of a data symbol to be transmitted multiplied by a weighting factor, and
the matrix is divisible into sub-matrices of dimension at least 2×2 such that, for each two sub-matrices being in the same diagonal of sub-matrices of the sub-divided matrix, each components of one of the two sub-matrices comprises the same weighting factor as the corresponding component of the other of the two sub-matrices except for multiplication with −1 and complex conjugation.

22. The method according to claim 1, wherein for the first matrix and the second matrix it holds that if two components of the matrix are equal or the complex conjugate of a data symbol multiplied with a weighting factor and the data symbols are the same, the weighting factors are the same except for complex conjugation and sign.

23. A non-transitory computer readable medium having stored thereon a computer program having a program code, which, when executed by a computer, makes the computer perform a method for transmitting a plurality of data symbols using a plurality of transmit antennas and a plurality of transmission resources comprising:
generating a plurality of transmission symbols from the plurality of data symbols; and
associating each transmission symbol with one of the plurality of transmit antennas and one of the plurality of transmission resources,
wherein the transmission symbols are generated and associated with the transmit antennas and transmission resources such that the transmission symbols are written in the form of a first matrix with a sub-vector in a first dimension for each of the plurality of antennas and a sub-vector in a second dimension for each of the plurality of the transmission resources, such that each component of the matrix holds the transmission symbol that is transmitted using the antenna corresponding to sub-vector in the first dimension in which the component is positioned and using the transmission resource corresponding to the sub-vector in the second dimension in which the component is positioned, and the first matrix is represented as a combination of a second matrix and a third matrix, and wherein for each of the second matrix and the third matrix, each component of the matrix is equal to one of the data symbols or the complex conjugate of a data symbol to be transmitted multiplied by a weighting factor and the matrix is divisible into sub-matrices of dimension at least 2×2 such that, for each two sub-matrices having only column sub-vectors of the same columns or row sub-vectors of the same rows, at least one component of one of the two sub-matrices differs from the corresponding component of the other of the two sub-matrices in at least the phase or the absolute value of the weighting factor.

24. A method for transmitting a plurality of data symbols using a plurality of transmit antennas, a plurality of transmission resources, and a plurality of receiving antennas comprising:

generating a plurality of transmission symbols from the plurality of data symbols; and associating each transmission symbol with one of the plurality of transmit antennas and one of the plurality of transmission resources, wherein the transmission symbols are generated and associated with the transmit antennas and transmission resources such that the transmission symbols are written in the form of a first matrix with a sub-vector in a first dimension for each of the plurality of antennas and a sub-vector in a second dimension for each of the plurality of the transmission resources, such that each component of the matrix holds the transmission symbol that is transmitted using the antenna corresponding to sub-vector in the first dimension in which the component is positioned and using the transmission resource corresponding to the sub-vector in the second dimension in which the component is positioned, the first matrix is represented as a combination of two multi antenna precoding matrices for a transmission system with the same number of transmit antennas as in the plurality of transmit antennas and with less receiving antennas as in the number of receiving antennas.

* * * * *